United States Patent [19]

Ascheron et al.

[11] Patent Number: 4,664,537
[45] Date of Patent: May 12, 1987

[54] CAGE FOR TAPERED-ROLLER BEARING

[75] Inventors: Eberhard Ascheron; Konrad Kühnlenz, both of Leipzig; Dieter Oetzel, Mittweide; Dietrich Woschek, Luckenwalde, all of German Democratic Rep.

[73] Assignee: VEB Kombinat Walzlager u. Normteile, Karl Marx Stadt, German Democratic Rep.

[21] Appl. No.: 779,732

[22] Filed: Sep. 24, 1985

[30] Foreign Application Priority Data

Oct. 1, 1984 [DD] German Democratic Rep. ... 267872

[51] Int. Cl.⁴ .................. F16C 33/66; F16C 33/46; F16C 33/56
[52] U.S. Cl. .................................... 384/470; 384/571; 384/572; 384/576
[58] Field of Search ......... 384/470, 462, 548, 571–580

[56] References Cited

U.S. PATENT DOCUMENTS

| | | | |
|---|---|---|---|
| 1,668,112 | 5/1928 | Gibbons | 384/580 |
| 3,075,278 | 1/1963 | Bratt | 384/579 X |
| 3,096,129 | 7/1963 | Hay | 384/470 |
| 3,133,770 | 5/1964 | Cowles | 384/575 |
| 3,482,891 | 12/1969 | Evangelista et al. | 384/575 |
| 3,744,863 | 7/1973 | Derner et al. | 384/571 |
| 3,951,483 | 4/1976 | Nakamura | 384/571 |
| 4,288,129 | 9/1981 | Ryanen | 384/576 |
| 4,317,601 | 3/1982 | Faigley, Jr. | 384/576 |
| 4,323,289 | 4/1982 | Suzuki | 384/470 X |
| 4,541,738 | 9/1985 | Leibensperger et al. | 384/572 X |

Primary Examiner—Stuart S. Levy
Assistant Examiner—Thomas R. Hannon
Attorney, Agent, or Firm—Jordan and Hamburg

[57] ABSTRACT

The invention relates to cages for tapered roller bearings, which are guided on the rolling path of the external ring and thereby, in contrast to known constructions with internal flange guidance or rolling body guidance, are provided with a considerable improvement of the guidance quality. The cage guidance on the spherically configured rolling paths of the external ring results in better lubricating conditions because of an approximately slightly wedge-shaped guide slit, whereby the admissible upper limit of the rotational speed of the tapered roller bearings is considerably increased.

4 Claims, 2 Drawing Figures

CAGE FOR TAPERED-ROLLER BEARING

BACKGROUND OF THE INVENTION AND PRIOR ART STATEMENT

This invention relates to tapered roller bearings of improved construction with respect to the guidance of the cages in the bearing.

There are known, for example, massive cages for tapered roller bearings, consisting of two parts, a collar part and a cage cover, which are connected, for instance, by rivet joints. Furthermore, there exist integral massive cages for tapered roller bearings, which are guided on the flanges of the inner ring. There are also known integral massive cages for tapered roller bearings, which are guided only on the roller guide flange and are used as open collar cage as well as flange-guided or roller-guided sheet-metal cages, which are predominantly, however not exclusively, made in one piece. The mentioned cage constructions are suitable only for use in normal cases of practical operation, however, they do not meet the steadily increasing requirements for attaining high rotational speeds, particularly in the machine-tool industry, because the internal centering of the cages quickly causes an increase of the cage play which is the cause of premature bearing failure. Furthermore, internal guidance requires an additional machining, for example, of the guide flange surfaces. This results in increased production costs and higher costs of the means of production.

The object of the invention is to eliminate the deficiencies of the known cage embodiments and thus attain improved operating characteristics of the tapered roller bearings, for example, higher upper limits of rate of revolutions.

The technical object, which is solved by the invention, consists in providing cages for tapered roller bearings which, in contrast to the known configurations with internal flange guidance, have an improved guidance quality without therefore requiring additional auxiliary means.

SUMMARY OF THE INVENTION

According to the invention, the object is solved in that the cage, in every possible variant, (for example, massive, made of metal or plastic, sheet-metal, integral or in multiple parts) is constructed such that an external guidance of the cage is attained on the rolling path of the external ring i.e. race. The cage is therefore of such configuration that its outer surfaces are tapered corresponding to the angle of the rolling path and the diameters thereof with the rolling path of the external ring laterally, result in a suitable guide slit s (guidance play). Furthermore, because of an annular groove machined from the outside (for example, by lathing, rolling, pressing or die-casting) having a width of approximately ⅔ of the length of the tapered rollers and a depth of such extent that retaining noses for the rollers can be arranged (for example, rolled on, stamped on, die-cast on), the tapered rollers are safeguarded with little tolerance from falling out and a simple assembly process is assured, as is the case in already known constructions of the cages.

The external guidance of the cages on the rolling path of the external ring has not been constructed up to now for tapered roller bearings. A reason why this has not been done, is not documented by the "persons skilled in the art".

The special advantages of the cages constructed according to the invention are:
- with respect to production engineering more advantageous geometric shape, also for tapered roller bearing cages, which are guided on the rolling path of the external ring and which are produced, for instance, by metal cutting, mechanical working or by plastic injection methods;
- improved lubricating conditions on the guide surfaces, i.e., between the tapered external surfaces of the cage and the spherically configured rolling path of the external ring of the bearing, whereby there results an approximately wedge-shaped slit; the lubricant is suctioned better into the slit than into a parallel slit;
- increase of upper limit of permissible rate of revolutions because of improved lubrication.

BRIEF DESCRIPTION OF THE DRAWINGS

One example of the embodiment of the cages according to the invention is illustrated by the drawings in which.

DETAILED DESCRIPTION OF A PREFERRED EMBODIMENT

Figure 1:
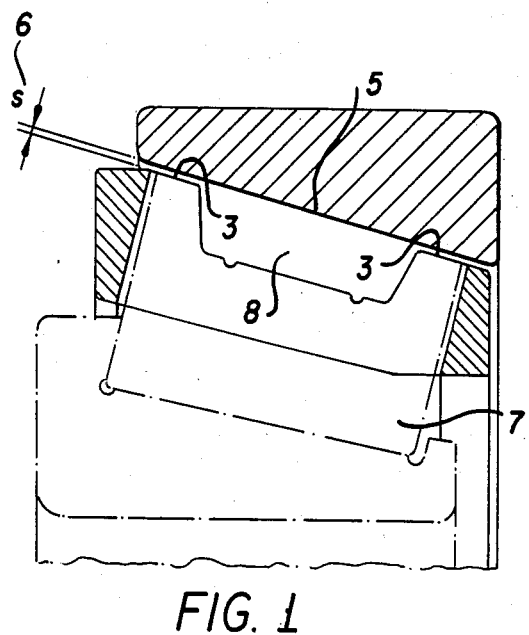
FIG. 1 is a partial axial view in the plane in which the bearing axis is lying, having an integral massive cage construction.
Figure 2:
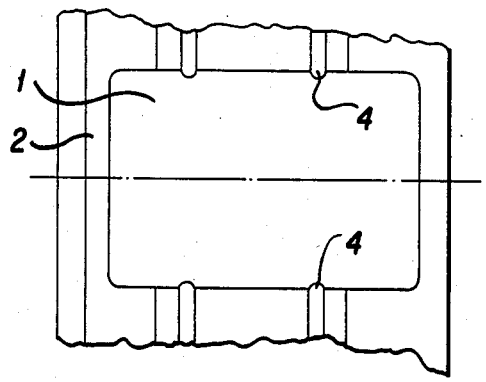
FIG. 2 is a partial development of the massive cage for tapered roller bearings according to FIG. 1.

The roller pockets 1 are conventionally worked into the cage 2 according to FIGS. 1 and 2 (for example, by roller tools, cutting dies or die-cast method). The external surfaces of the cage 2 are the tapered guide surfaces 3, which guide the cage 2 with the guide slit s 6 on the rolling path 5 of the external ring. On the cage 2 is worked an annular groove 8 which extends from the outside towards the inside, having a width of approximately ⅔ of the length of the tapered roller 7. Because of this, the retaining noses 4 can be mounted such that the tapered rollers 7 have a smaller radial sag and the bearing can be assembled without problems.

The rolling path 5 of the external ring is of the required and to the customary extent spherical configuration, whereby in conjunction with the tapered guide surfaces 3 of the cage 2 there is formed an approximately wedge-shaped guide s 6, into which the lubricant is suctioned. The slightly "wedge-shaped form" of the guide slit s 6 is neither recognizable nor illustrated in FIG. 1, because the values are of a magnitude of a few $\mu m$ (flaring of the slit).

We claim:

1. A tapered roller bearing comprising outer and inner annular races having roller contact surfaces skewed in the same sense with respect to the axis of the bearing, tapered rollers and a cage retaining the rollers in rolling contact with the outer and inner races, the roller contact surface of the outer race being a toroid generated by an arc the convexity of which faces the rollers, the cage having pockets formed therein each for retaining a respective roller and a pair of annular guide surfaces on the respective lateral borders of the cage facing the roller contact surface of the outer race, the guide surfaces each being generated by a straight line, being skewed like the races and at each point being of slightly smaller diameter than the opposing point on the roller contact surface of the outer race thereby to form a respective slit between each of the guide surfaces and the opposing portion of the roller contact surface of the outer race, the size of each of the slits in terms of the distance between said opposing points decreasing in the direction toward the axial center of the cage whereby entry of lubricant into and passage of lubricant along the slits is facilitated.

2. The tapered roller bearing according to claim 1, in which formed in and approximately centered on the cage is an annular groove of axial length approximately two-thirds of the axial length of the rollers retained therein, the axial length of the cage being approximately equal to the axial length of the rollers retained therein, whereby said guide surfaces are limited to the portions of the cage extending axially beyond the groove.

3. The tapered roller bearing according to claim 1, in which the groove has base portions extending from pocket to pocket and means for retaining the rollers in the pockets are arranged in said base portions.

4. The tapered roller bearing according to claim 1, in which said size of each of the slits is on the order of a few microns.

* * * * *